United States Patent [19]

Wilkie

[11] Patent Number: 4,570,436
[45] Date of Patent: Feb. 18, 1986

[54] APPARATUS FOR ASSEMBLING CONVEYOR CHAIN

[76] Inventor: Donald S. Wilkie, 22535 Maple, St. Clair Shores, Mich. 48081

[21] Appl. No.: 430,783

[22] Filed: Sep. 30, 1982

[51] Int. Cl.4 .............................................. B21L 9/06
[52] U.S. Cl. ................................................ 59/7; 59/4
[58] Field of Search ...................... 59/7, 8, 4, 5, 6, 12, 59/35.1, 901

[56] References Cited

U.S. PATENT DOCUMENTS

| | | | |
|---|---|---|---|
| 705,842 | 7/1902 | Howe | 59/7 |
| 870,704 | 11/1907 | Weston . | |
| 1,256,897 | 2/1918 | Hayward | 59/7 |
| 1,835,111 | 12/1931 | Dow . | |
| 1,848,493 | 3/1932 | Oldacre . | |
| 2,024,183 | 12/1935 | Pribil . | |
| 2,499,336 | 2/1950 | Teerlink et al. | 59/7 |
| 2,507,025 | 5/1950 | Lemmon | 74/254 |
| 2,700,870 | 2/1955 | Green | 59/7 |
| 2,831,316 | 4/1958 | Linde, Jr. | 59/7 |
| 3,802,184 | 4/1974 | Brown et al. | 59/7 |
| 3,943,702 | 3/1976 | Lacombe-Allard | 59/4 |

Primary Examiner—Francis S. Husar
Assistant Examiner—Linda McLaughlin
Attorney, Agent, or Firm—Harness, Dickey & Pierce

[57] ABSTRACT

The assembly machine of the present invention automatically assembles chain elements into a continuous chain at a high speed. The machine automatically aligns and assembles elements into assembled relation and includes structure for aligning a pair of side links with a first center link, structure for assembling a first pin in assembled relationship with the pair of side links and first center link, structure for aligning a second center link with said pair of side links, structure for assembling a second pin in assembled relationship with the pair of side links and second center link, and structure for advancing assembled chain elements.

4 Claims, 26 Drawing Figures

APPARATUS FOR ASSEMBLING CONVEYOR CHAIN

BACKGROUND OF THE INVENTION

The present invention relates to an assembly apparatus and more particularly to an apparatus adapted to assemble elements of rivetless conveyor chain.

The original rivetless chain was the subject matter of U.S. Pat. No. 870,704, Nov. 12, 1907, to Weston. The chain which was the subject matter of the Weston patent is variously referred to as "keystone", "rivetless", or "Weston" chain and has had wide application in conveyor, mining machinery, and other industrial uses. Rivetless chain is strong, adaptable as a sprocket chain, and subject to lengthening or shortening by manually adding or removing individual links of the chain.

Generally speaking rivetless chain consists of alternating units of center links and pairs of side bars joined together by headed pins. Each center link consists of an individual piece of metal having a pair of laterally spaced side walls joined at their ends by curved end walls, said side and end walls enclosing or surrounding an elongated slot. A pair of side bars, each having an elongated slot at each end, is pivotally connected to each end of each center link by headed pins, each pin having a transverse head on each end thereof similar to the headed end of a T-head machine bolt. The side bars are formed at their ends with transversely extending recesses on their outer faces in which the heads of the pins are seated to lock the pins in position after the center links and side bars have been coupled together. Each of the center links has a narrow central portion which tapers outwardly adjacent to the ends of the link to form thickened portions at the link ends. When the center links and side bars are assembled by means of the headed pins to form a chain, the side bars and center links are arranged in alternate relationship along said chain, each center link having connected to each end thereof a pair of spaced side bars and each such pair of side bars being connected at each end to an adjacent center link and so that pivotal movement is permitted between the adjacent center links and side bars about the center of headed pins as an axis.

An improved rivetless chain is disclosed in U.S. Pat. No. 2,507,025, May 9, 1950, to Lemmon which is directed to a center link for rivetless chain having thickened end portions with convexly curved upper and lower faces and a central portion, the upper and lower faces of which are also convexly curved, said curved end portions and central portion of said link being connected by reentrant concave surfaces which merge gradually with said end and central portions without the formation of any sharp lines of demarkation or clevage. The improved center links set forth in the Lemmon patent are commonly used today, and the present invention is particularly well adapted to assemble rivetless chain having such improved center links.

As will be appreciated by those skilled in the art, although rivetless chain enjoys many advantages and is in wide commercial use, the assembly thereof has heretofore been a tedious hand operation with relatively slow assembly speeds and relatively high cost. It would, therefore, be advantageous if the assembly of rivetless chain could be done in an efficient and economical manner by a machine. Thus, in accordance with the present invention, a machine for assembling rivetless chain is provided. While the present machine can be adapted to assemble various types of chain, it is particularly well adapted to assemble rivetless chain as disclosed in the aforementioned Lemmon patent, the disclosure of which is specifically incorporated by reference herein.

SUMMARY OF THE INVENTION

The assembly machine of the present invention automatically assembles chain elements into a continuous chain at a high speed. The machine automatically aligns and assembles elements into assembled relation and includes means for aligning a pair of side links with a first center link, means for assembling a first pin in assembled relationship with the pair of side links and first center link, means for aligning a second center link with said pair of side links, means for assembling a second pin in assembled relationship with the pair of side links and second center link, and means for advancing assembled chain elements.

BRIEF DESCRIPTION OF THE DRAWINGS

FIG. 3 is a side elevational view of a portion of the chain advance mechanism of the apparatus;

FIG. 4 is a side elevation taken in the direction of arrows 4—4 in FIG. 1;

DESCRIPTION OF THE PREFERRED EMBODIMENTS

Figures 14, 15:
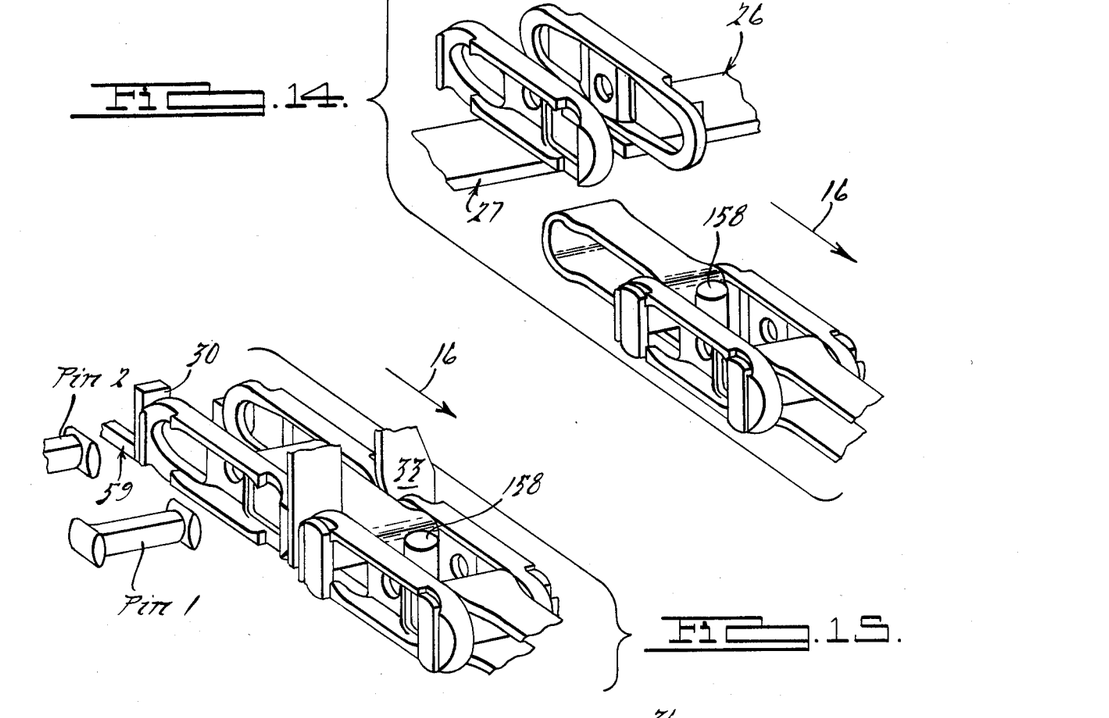
FIG. 14 is a perspective view showing the position of chain elements at the "ready" status of machine operation.
FIG. 15 is a perspective view showing the position of chain elements at step 1 of machine operation.
Figures 16, 17:
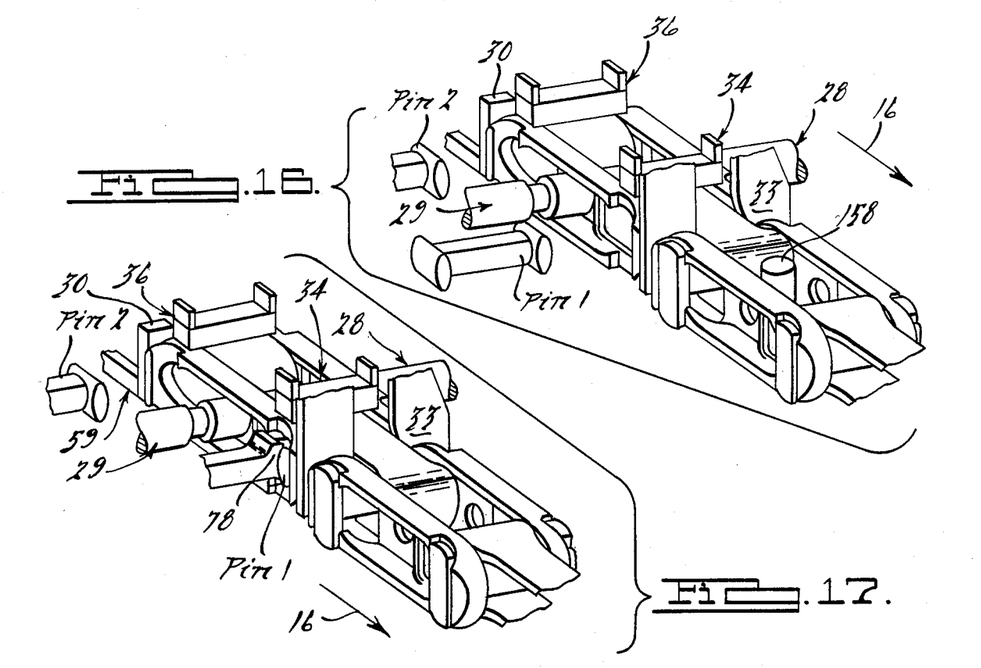
FIG. 16 is a perspective view showing the position of chain elements at step 2 of machine operation.
FIG. 17 is a perspective view showing the position of chain elements at step 3 of machine operation.
Figures 18, 19:
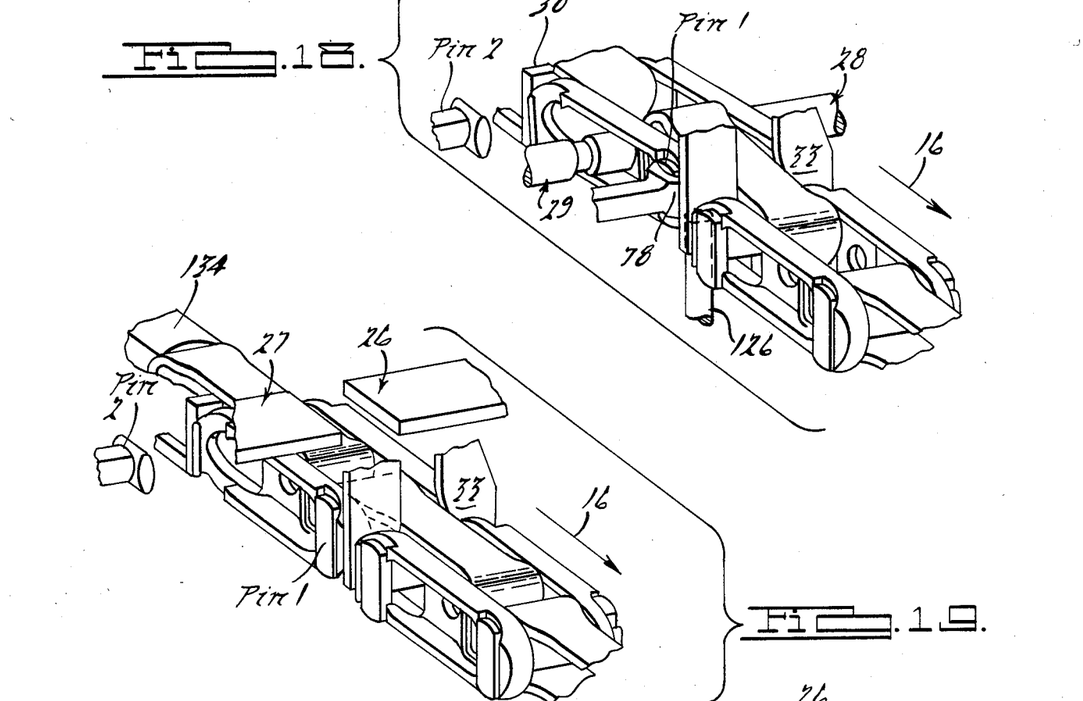
FIG. 18 is a perspective view showing the position of chain elements at step 4 of machine operation.
FIG. 19 is a perspective view showing the position of chain elements at step 5 of machine operation.
Figures 20, 21:
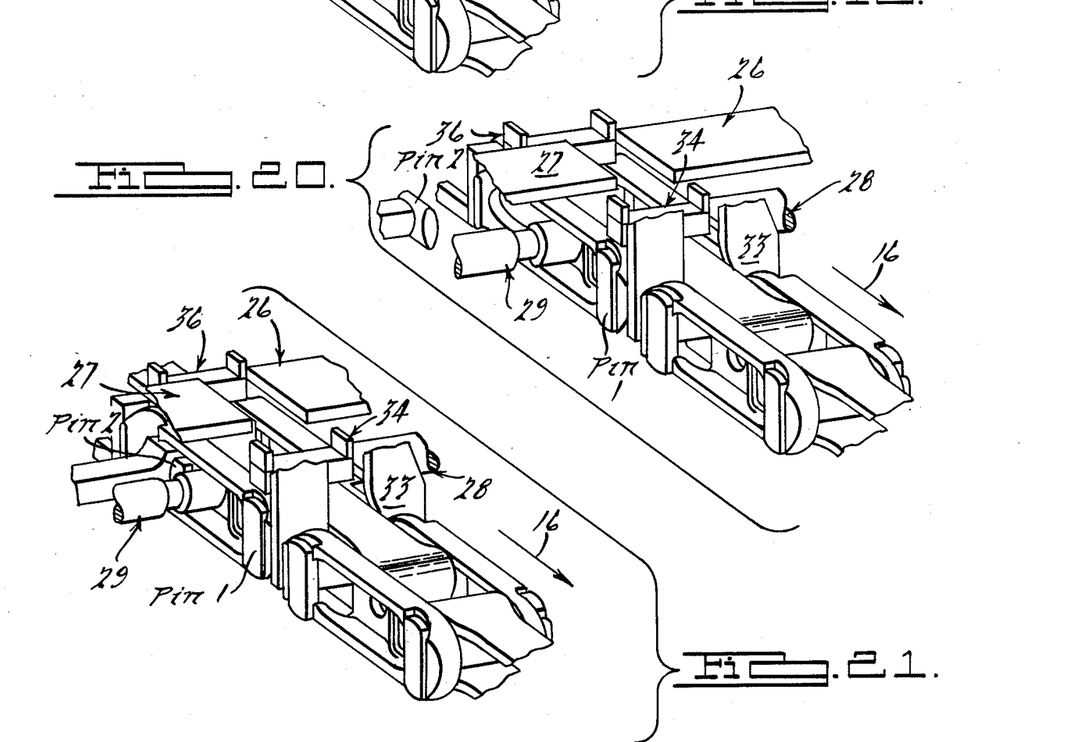
FIG. 20 is a perspective view showing the position of chain elements at step 6 of machine operation.
FIG. 21 is a perspective view showing the position of chain elements at step 7 of machine operation.
Figure 22:
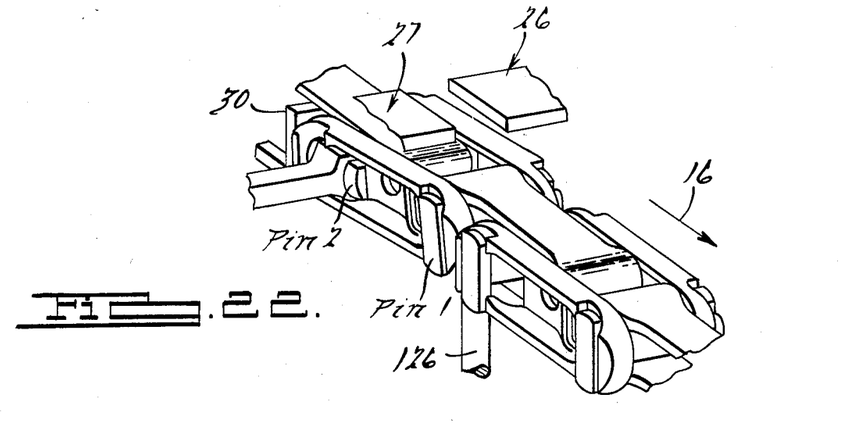
FIG. 22 is a perspective view showing the position of chain elements at step 8 of machine operation.
Figure 23:
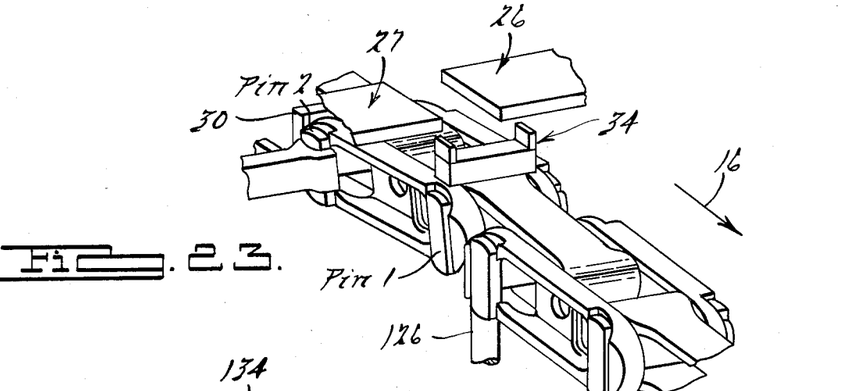
FIG. 23 is a perspective view showing the position of chain elements at step 9 of machine operation.
Figure 26:
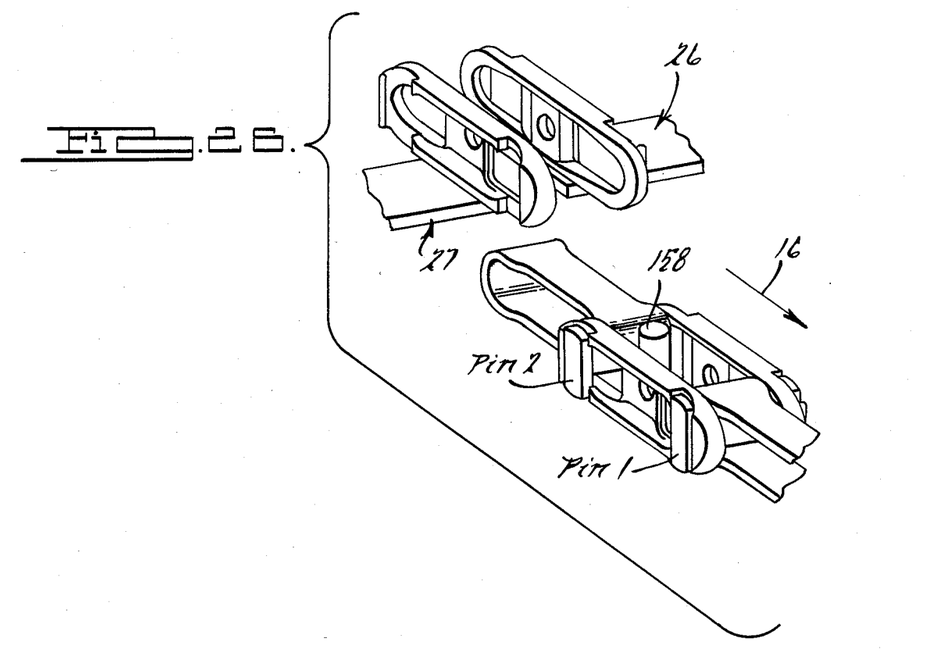
FIG. 26 is a perspective view showing the position of chain elements at step 15 of machine operation.

In order that the detailed description which follows may be better understood, a general description of the mode of operation of the machine of the present invention will first be given. Generally speaking, the chain assembly machine of the present invention is adapted to place chain elements in appropriately aligned and assembled relationship in a sequential and continuous manner to thereby provide an assembled length of chain. Chain assembly begins with the machine in the "ready" status and chain elements in the following positions as illustrated in FIG. 14: a first center link in a first assembly position and a second center link and a pair of side links and first and second pins in the ready to feed position. Then the side links are placed in alignment with respect to the center link in a first assembly position as illustrated in FIG. 16 and a first pin is pushed through the pair of side links and center link and rotated 90 degrees as illustrated in FIGS. 17 and 18. Next, the pair of side links and a second center link are placed in alignment in a second assembly position as illustrated in FIG. 20 and a second pin is inserted through the pair of side links and second center link and rotated 90 degrees as illustrated in FIGS. 21-23. Finally, the chain is advanced one unit of length to a position as illustrated in FIG. 26 whereby the second center link is in first assembly position to complete one cycle of operation of the chain assembly machine.

Now referring to FIGS. 1-13, a preferred embodiment of a machine for assembling rivetless chain is shown and indicated generally by the numeral 10. Machine 10 generally comprises means for aligning a pair of side links with a first center link; means for assembling a first pin in assembled relationship with the pair of side links and first center link; means for aligning a second center link with the pair of side links; means for assembling a second pin in assembled relationship with the pair of side links and second center link; and means for advancing the assembled side links and center link.

The operation of machine 10 is carried out by means of a plurality of air cylinders which are mounted on base plate 12 or overhead framework 14 which is itself mounted on base plate 12. Overhead framework 14 also supports feed racks. Additional air cylinders are also supported below base plate 12. As will be further appreciated from the Figures and the disclosure which follows, chain elements are assembled into chain units by means of these air cylinders acting in cooperation with guide rails, stops and the like to insure proper alignment of chain elements.

The means for aligning side links with respect to a first center link includes means for aligning a left side link and means for aligning a right side link. As used herein the terms "left" and "right" refer to the left or right when viewing along the center line of, and in the direction of, chain movement. The direction of chain movement is indicated by arrows 16. As best shown in FIGS. 5-12, means for aligning a left side link comprises feed rack 20 (see FIGS. 5 and 6), a pair of guide rails 22 (see FIGS. 6 and 8), side link positioner assembly 24 (see FIGS. 6 and 8), side link drop assembly 26 (see FIGS. 6 and 8), clamp assembly 28 (see FIG. 10), stop 30 (see FIG. 10), gate assembly 32 (see FIG. 11) and side link hold-downs 34 and 36 (see FIGS. 5 and 8). Left side link positioner assembly 24 comprises air cylinder 38 (see FIG. 1) which is operatively connected to positioner head 40 (see FIGS. 5, 6 and 8) which is adapted to push the bottommost side link in feed rack 20, over rails 22 and onto drop plate 42 (see FIGS. 6 and 11) which is operatively connected to side link drop cylinder 44 (see FIG. 2). Left side link drop assembly 26 comprises drop plate 42 and side link drop cylinder 44. When actuated, side link drop cylinder 44 moves drop plate 42 leftwardly as viewed in FIG. 6, thereby allowing the side link thereon to fall between stop 30 and gate 33 of gate assembly 32 onto left limit switch plate 46 (see FIG. 1). Side link clamp assembly 28 includes head 48 which is attached to side link clamp cylinder 50. First and second side link hold-down assemblies have side link hold-downs 52 and 54 (see FIG. 8) operatively connected to cylinders 56 and 58 (see FIG. 5) and provide positive downward positioning for both left and right side links. Side link push assembly 59 (see FIGS. 1, 2 and 6) operates simultaneously against both left and right side links.

Figure 11:
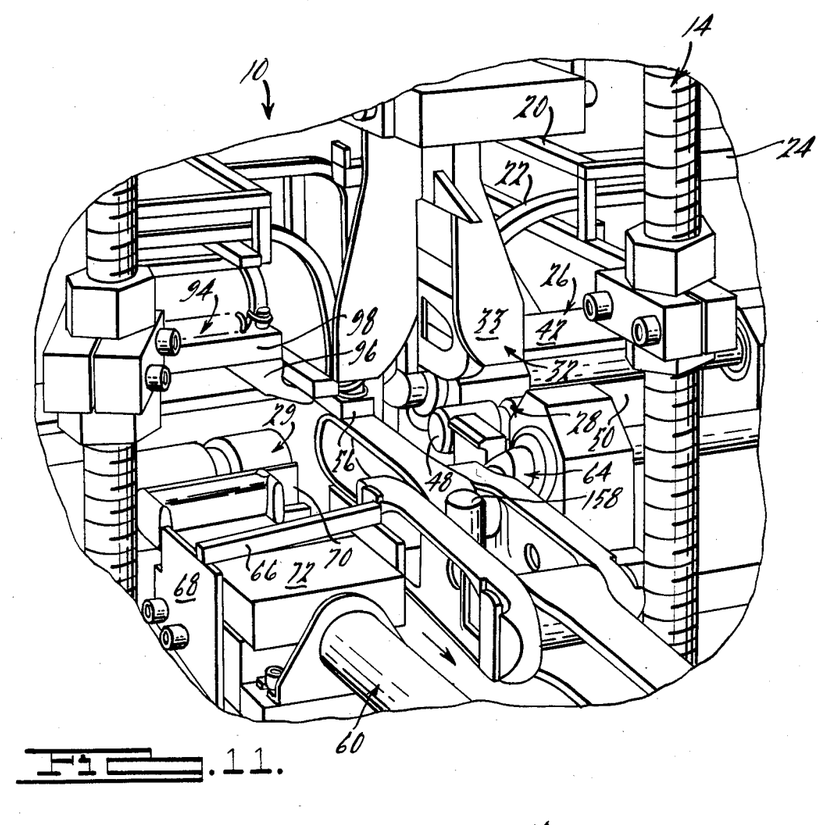
Figure 12:
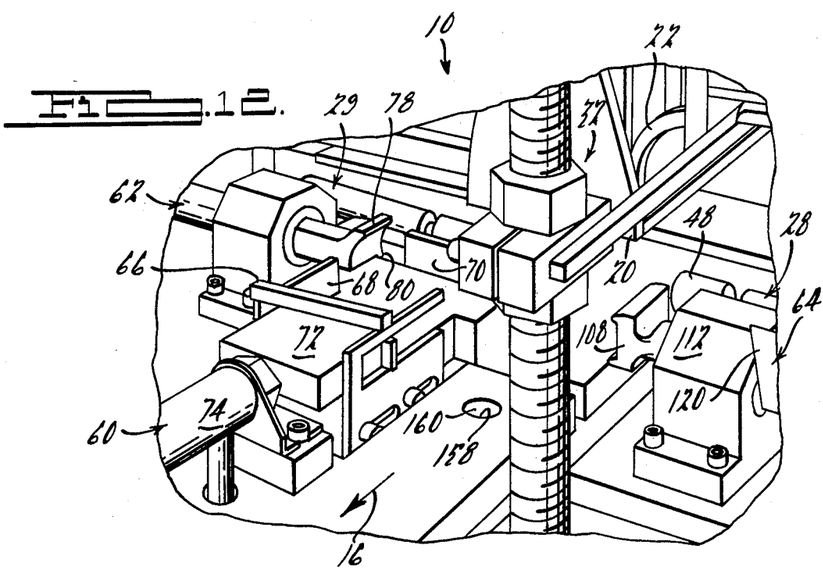

The means for aligning a right side link, has structure analogous to that of the means for aligning a left side link including right side link drop positioner assembly 25 (see FIG. 6), right side link drop assembly 27 (see FIG. 6) and right side link clamp assembly 29 (see FIG. 11). It will be appreciated that gate assembly 32 and side link hold-down assemblies 34 and 36 operate to simultaneously contact both left and right side links.

The means for assembling pin 1 through a pair of side links and a center link generally comprises pin 1 position assembly 60 (see FIGS. 1, 2, 4, 5, 11 and 12), pin 1 push assembly 62 (see FIGS. 1, 5, 8 and 12) and pin 1 turn assembly 64 (see FIGS. 1, 2, 11 and 12). Pin 1 position assembly 60 has a pin feed rack 66 which is adapted to hold a stack of headed pins. The bottommost pin in rack 66 is pushed over pin 1 pin block 67 along a guide 68 and against stop 70 by position head 72 which is operatively connected to pin 1 position cylinder 74. Thus, pin 1 position assembly 60 is adapted to place a first pin into a position for insertion through the pair of side links and center link. A limit switch 76 is provided to signal when the first pin is in a ready to push position. Pin 1 push assembly comprises shoe 78 (see FIGS. 8 and 12) which has a finger 80 (see FIG. 12) and which is carried on the forward end of rod 82 (see FIGS. 1, 2 and 5) which extends through forward linear bearing 84 (see FIGS. 5 and 8) and rearward linear bearing 86 (see FIG. 4) which allow for both axial and rotational movement of rod 82 therein. Rod 82 is operatively connected to pin 1 push cylinder 88 (see FIG. 1) and carries a turning arm 90 (see FIGS. 1, 4 and 8). A first guide assembly 92 (see FIG. 1) maintains rod 82 in proper rotational alignment while a second guide assembly 94 (see FIGS. 1, 4, 5 and 11) maintains pin 1 in proper alignment when it is pushed by shoe 78. Second Guide assembly 94 has a guide head 96 connected to lever 98 which is pivotally mounted on support 100 and operatively connected to second guide assembly cylinder 102.

Figure 1:
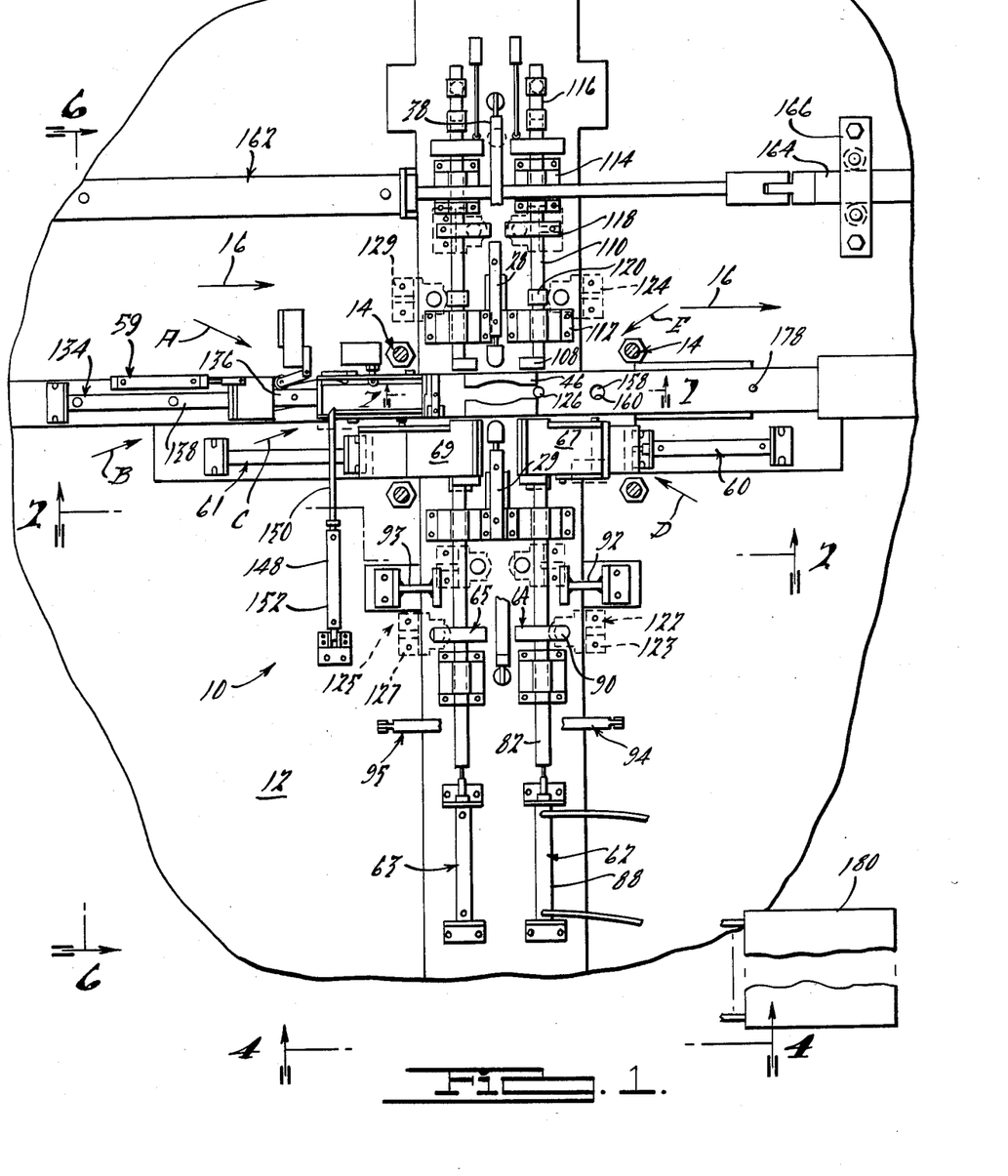
FIG. 1 is a sectional view of the apparatus of the present invention taken along line 1—1 in FIG. 4.
Figures 2, 5:
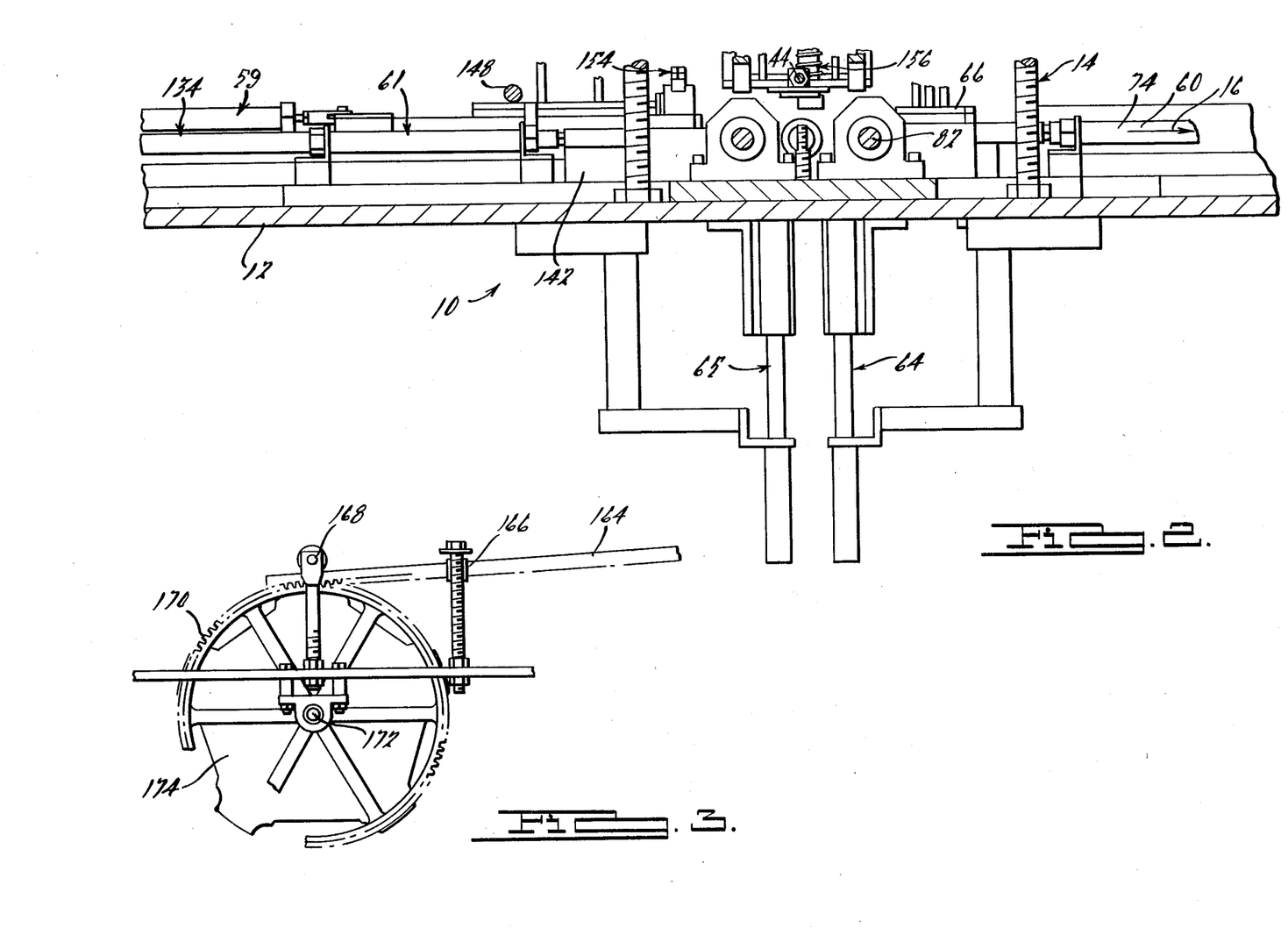
FIG. 2 is a sectional view, taken along line 2—2 in FIG. 1.
FIG. 5 is a plan view, with portions broken away, of the apparatus of the present invention.
Figure 5:
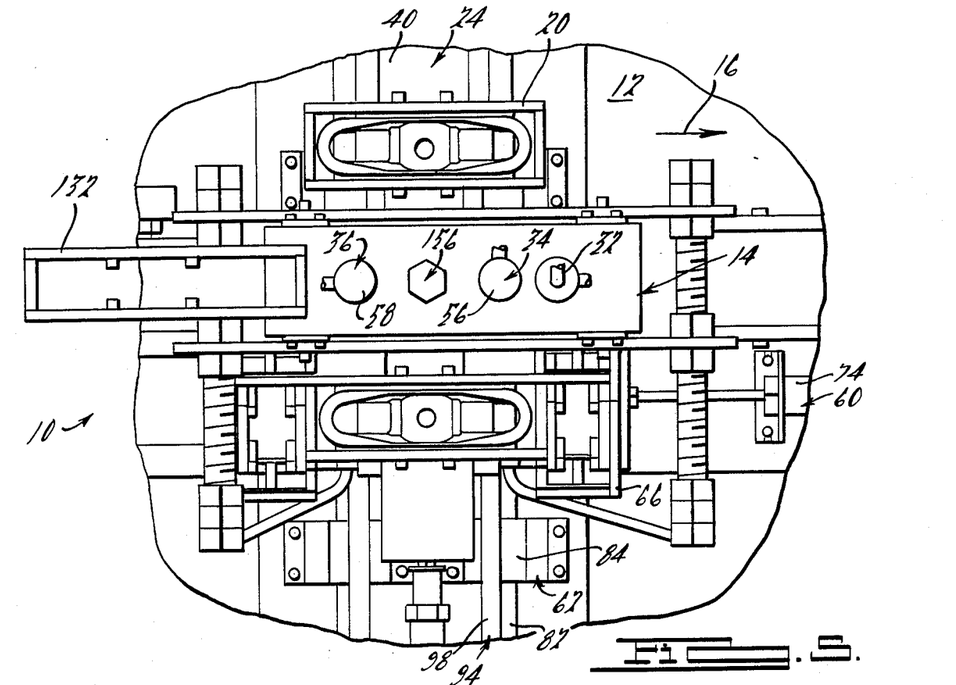
Figure 6:
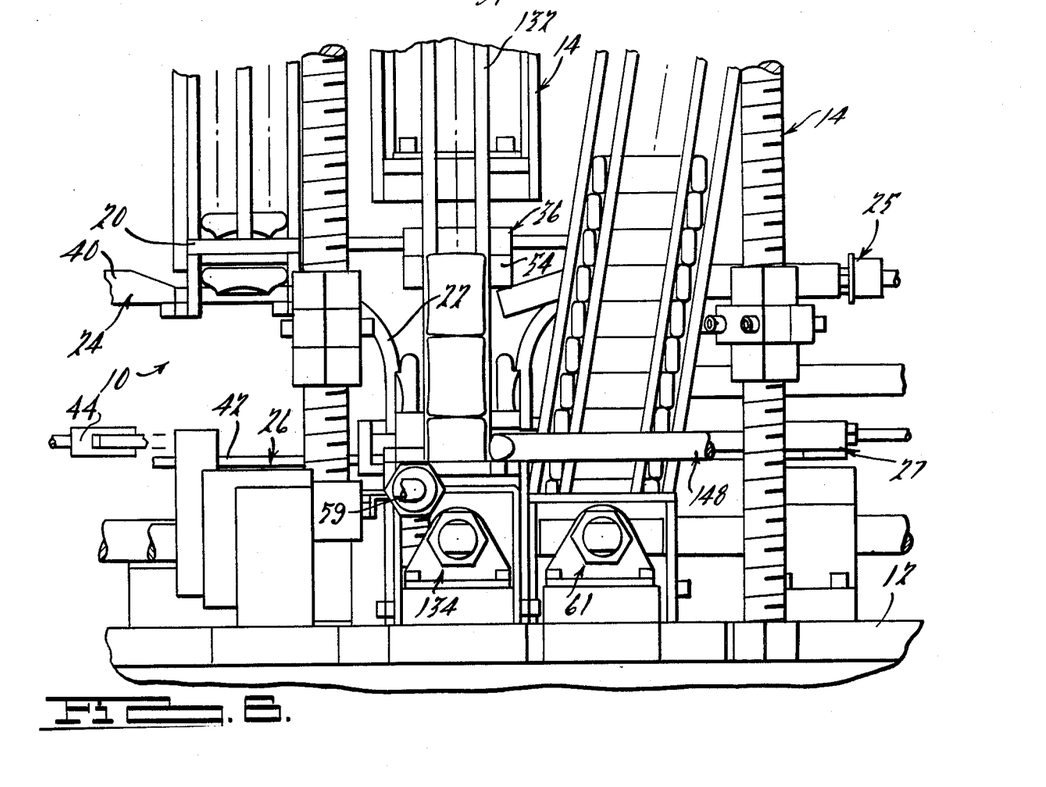
FIG. 6 is an end elevational view, with portions broken away, taken in the direction of arrows 6—6 in FIG. 1.
Figure 7:
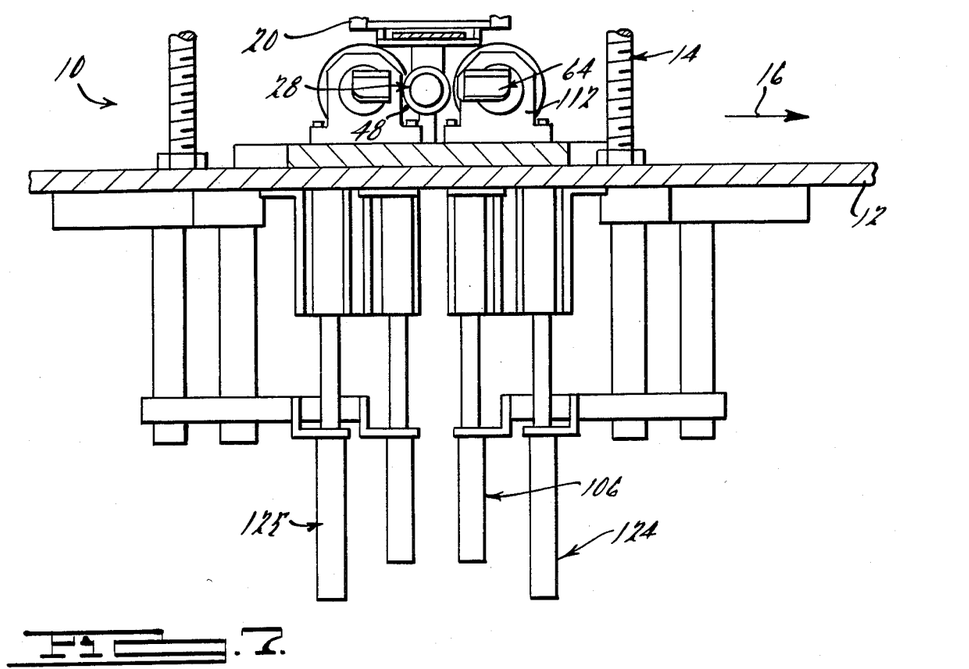
FIG. 7 is a sectional view taken along line 7—7 in FIG. 1.
Figure 8:
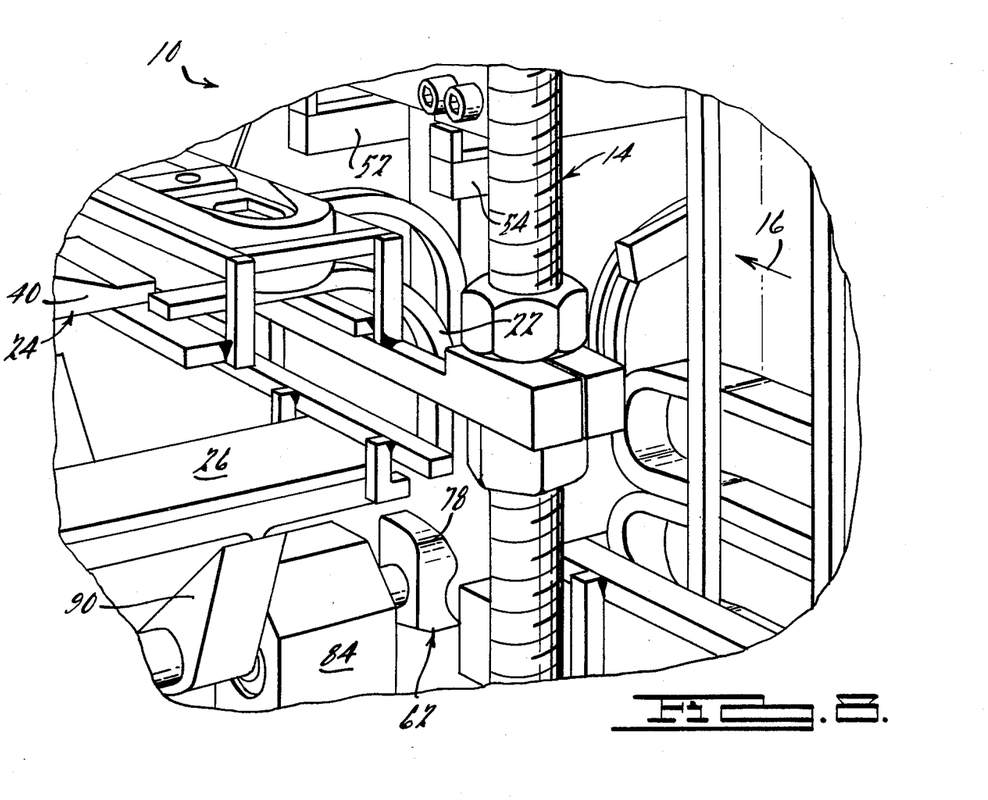
FIGS. 8–12 are perspective views, taken in the directions of arrows A–E respectively in FIG. 1 of portions of the apparatus of the present invention with chain elements shown in place.

Means for turning pin 1 comprises pin 1 turn assembly 64 which comprises turning arm 90 on rod 82, turn cylinder assemblies 104 (see FIG. 4) and 106 (see FIG. 7), catch shoe 108 (see FIGS. 1 and 12), which is connected to the forward end of rod 110 (see FIG. 1) which extends through linear bearings 112 and 114 (see FIG. 1). The rearward end of rod 110 seats in thrust bearing assembly 116 (see FIG. 1) which has a spring to apply a spring bias on rod 110 (see FIG. 1) towards catch shoe 108. Rod 110 carries turning arm 118 and returning arm 120. Return cylinder assembly 122 (see FIGS. 1 and 4) comprising subassemblies 123 and 124 (see FIG. 7) cooperate with turning arm 90 and return arm 120 to rotate rods 82 and 110 to their original or start position. A center link lift assembly 126 (see FIG. 1) is mounted on the underside of table 12 and has a cylinder rod which extends upwardly through an aperture in table 12 and is adapted to lift the center link about ½ inch to allow pin 1 to be rotated into an assembled position.

The means for assembling pin 2 comprises pin 2 position assembly 61 (see FIGS. 1, 2 and 6), pin 2 push assembly 63 (see FIGS. 1 and 4), and pin 2 turn assembly 65 (see FIGS. 1, 2 and 4) which are of structure analogous to pin 1 turn assembly 64. A guide assembly 93 (see FIGS. 1 and 4) and a guide assembly 95 (see FIG. 1) are analogous to first and second guide assemblies 92 and 94. In addition, pin 2 return assembly 125 (see FIGS. 1 and 7) comprising subassemblies 127 and 129 analogous in structure and function to pin 1 return subassemblies 123 and 124, are provided as well as pin 2 pin block 69 (see FIG. 1). Pin 2 push assembly further comprises pin 2 guide assembly 95 (see FIG. 1) which insures proper insertion of pin 2.

Figure 9:
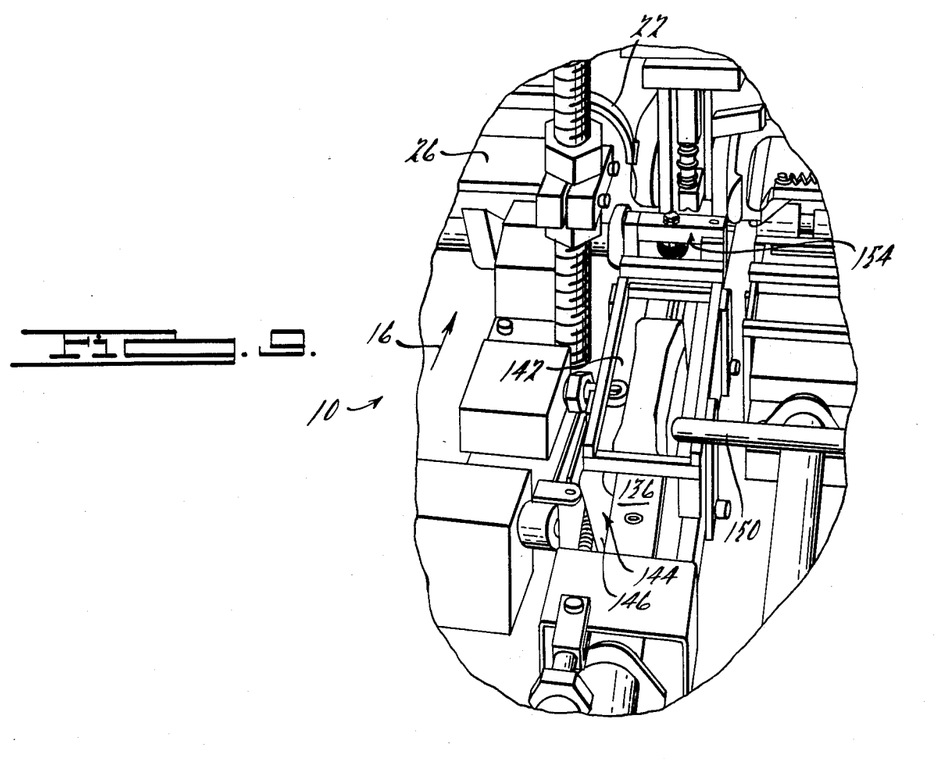
Figure 10:
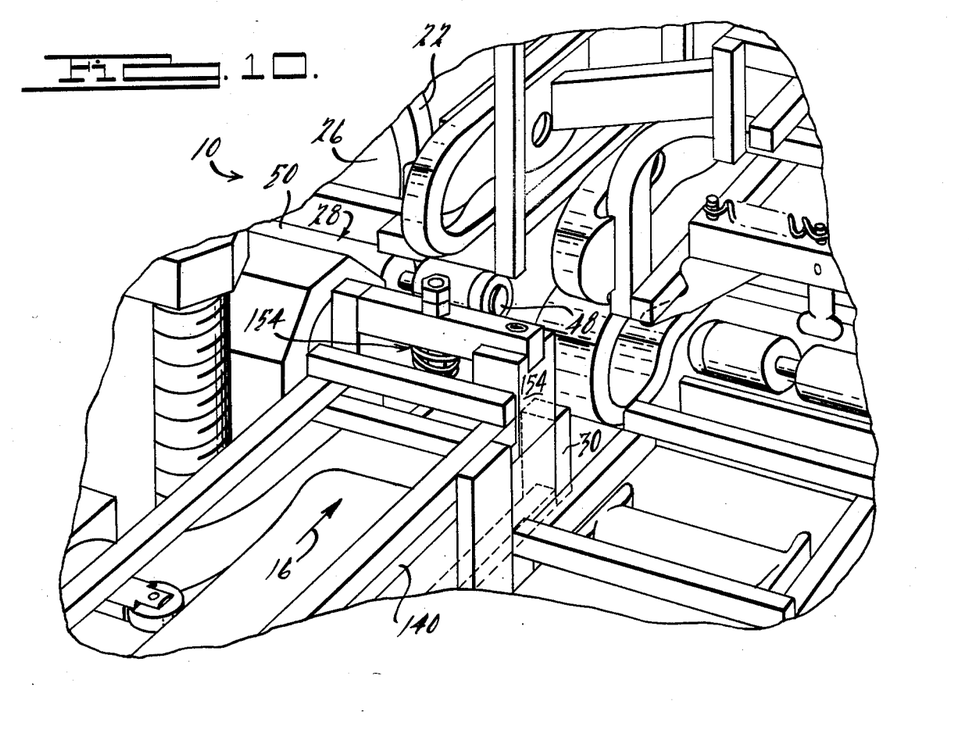

The means for aligning a second center link comprises center link rack 132 (see FIGS. 4, 5 and 6) which is adopted to hold a stack of center links. Push cylinder assembly 134 (see FIGS. 1, 2, 4 and 6) has a push head 136 (see FIGS. 1 and 9) with an arcuate forward face and which is operatively connected to cylinder 138 (see FIGS. 1 and 4) and adapted to push the bottommost center link in rack 132 forward between a pair of parallel guide rails 140 (see FIG. 10) and 142 (see FIGS. 2 and 9). As best shown in FIG. 9, a center link pull back assembly 144 is mounted in center link push head 136 and composes a finger 146 which is spring biased in a left direction. A center link hold up assembly 148 (see FIGS. 1, 2, 4 and 6) is provided to prevent premature falling of center links in rack 132. Hold up assembly 148 has a rod 150 (see FIGS. 1 and 9) which when actuated extends through the central aperture of the center link in rack 132 and which is operatively connected to cylinder 152 (see FIG. 1). Center link hold-down assembly 154 (see FIGS. 2, 9 and 10) is mounted on guide 142 (see FIGS. 2 and 9) and center link hold-down assembly 156 (see FIGS. 2, 4 and 5) is mounted on overhead framework 14 and placed to ensure proper positioning of center links. Center link stop assembly 158 (see FIGS. 1, 11 and 12) is mounted on the underside of table 12 and has a rod which extends upwardly through aperture 160 to contact and stop forward movement of the center link proximate thereto.

As best shown in FIGS. 1 and 3, the means for advancing assembled chain units includes chain advance cylinder assembly 162 having advance cylinder 163 which is connected to gear rack 164 which extends through cam rollers 166 and is held by cam roller 168 into engagement with gear 170. Gear 170 is mounted on shaft 172 which drives sprocket 174 through a clutch mechanism to provide uni-directional motion on sprocket 174 the teeth of which engage assembled chain and advance assembled chain elements between guide rails 176. An off-stop assembly 178 is provided to project upwardly into assembled chain upstream of sprocket 174 to prevent assembled chain downstream of sprocket 174 from causing rotation of sprocket 174 and advancement of assembled chain.

Figure 13:
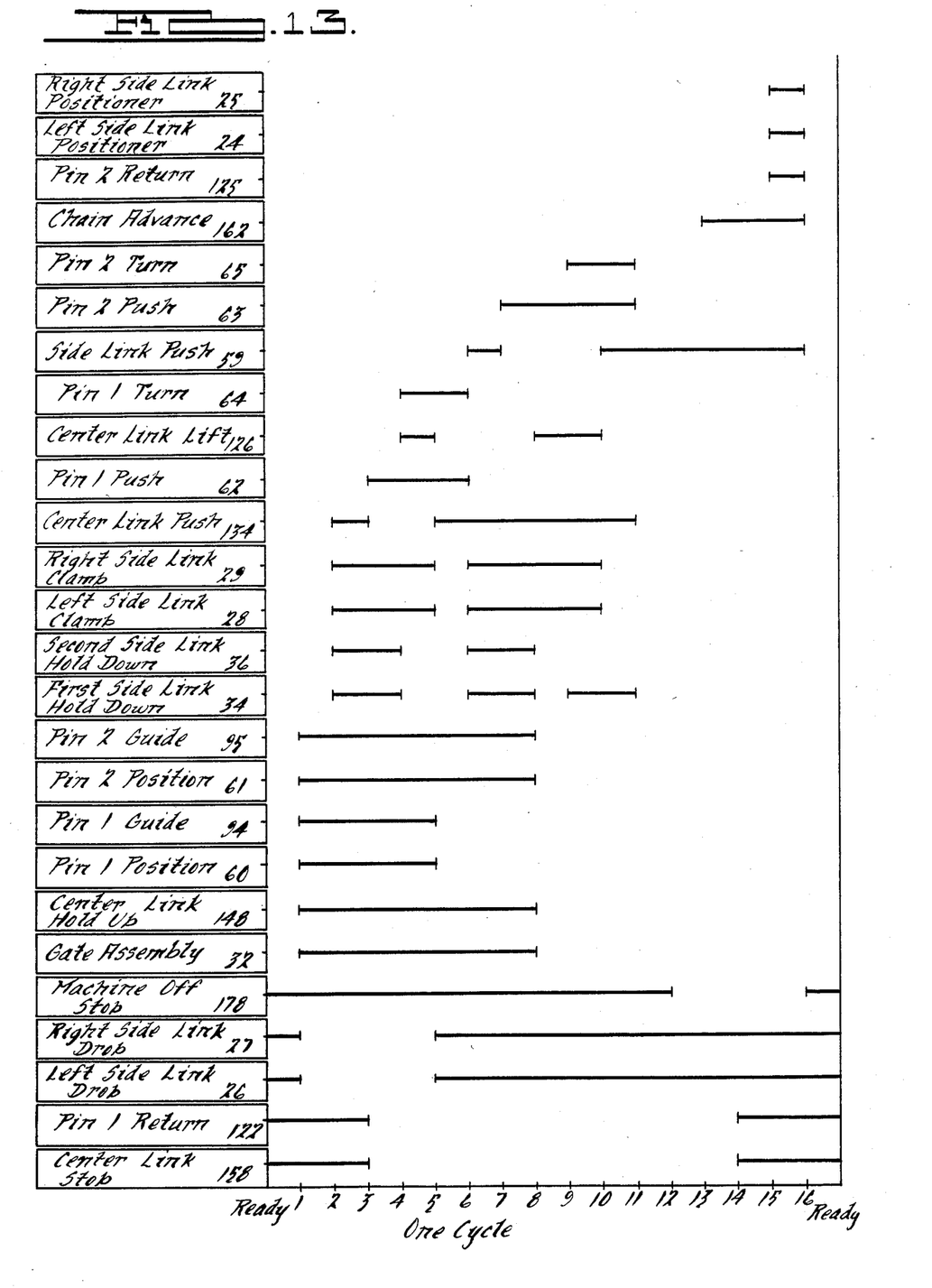
FIG. 13 is a schematic diagram showing the sequence of operation of air cylinders during one cycle of operation of an apparatus of the present invention.

Further understanding of the present invention will be had from the following description of the operation of chain assembling machine 10 to assemble chain. Reference may be had to FIG. 13 which sets forth the sequence of operation of air cylinders of machine 10 and to FIGS. 14 through 26 which illustrate the position of chain elements and certain machine elements during the steps of chain assembly which will facilitate understanding of the description which follows.

In operation, machine 10 assembles one unit of chain by carrying out a cycle of operation which comprises several sequencial steps controlled by any suitable control 180. It will be appreciated that the following description of steps is exemplary and that the exact operation of machine 10 may be subject to some modification and variation. Furthermore, it will be appreciated that the control signal means set forth hereinafter as limit switches may alternatively be proximity switches, photo electric devices, timers or other electronic or electromechanical devices known in the art. In FIG. 13, air cylinders of machine 10 are indicated in the left hand column. The horizontal lines to the right of each cylinder indicate when the cylinder is extended, or "on". Step sequence is indicated along the bottom edge of the Figure.

To begin chain assembly, machine 10 must be in the "ready" status as shown in FIG. 11 with assembled chain engaged on sprocket 174 and a center link in position with its forward end against stop assembly 158. FIG. 14 further illustrates the positioning of chain elements in the "ready" position. As indicated in FIG. 13, when machine 10 is in the ready status, stop assembly 158 left and right side link drop assemblies 26 and 27, pin 1 return assembly 122 and machine off-stop 178 are "ON". All other assemblies are "OFF". By the term "ON" it is meant that the air cylinder or cylinders of the assembly are extended. The term "OFF", of course, means that the cylinder or cylinders are retracted. To proceed with chain assembly, of course, a supply of chain elements must be present in the proper feed racks. To begin chain assembly, the machine proceeds to step 1 as illustrated in FIG. 15 with assemblies changing to the status indicated in FIG. 13. Thus, left side link drop plate 42 and the analogous right side link drop plate are withdrawn to drop a pair of side links down into position onto limit switch plate 46 and the analogous right limit switch plate; gate 33 comes down to insure that the side links assume a proper aligned position between stop 30 and gate 33; pin 1 and pin 2 are moved into position on pin blocks 67 and 69; and center link hold up extends through a next center link in the rack.

Upon full extension of gate 33, a signal is sent, as by a limit switch or the like, to begin cycle 2. In step 2, as illustrated in FIG. 16 first and second side link hold-down assemblies 34 and 36 come down to insure that the side links are held firmly down against table 12; side link clamp assemblies 28 and 29 extend to clamp the side links against the center link; center link push assembly 134 extends to insert a second center link between the side links to spread apart the upstream end of the side links to facilitate later turning of pin 1.

When the side links are held against the limit switch plates 46 and the analogous right plate, machine 10 is signaled to proceed to step 3. In step 3, as illustrated in FIG. 17, pin 1 is inserted through the side links and center link; center link stop assembly is retracted, pin 1 return assembly is retracted and the center link push assembly is retracted.

Full extension of pin 1 push cylinder 88 signals machine 10 to begin step 4. In step 4, as illustrated in FIG. 18, center link lift assembly 126 extends while pin 1 turn assembly 64 is actuated to turn pin 1 90°. The center link lift allows the upper lip of the side links to go above the center link to provide sufficient clearance to allow pin 1 to turn. The first and second side link hold-down assemblies 34 and 36 go off to allow the side links to be lifted upwardly.

Completion of pin 1 turn signals machine 10 to begin step 5. In step 5, as illustrated in FIG. 19, center link push assembly 134 pushes the first and second center links forward, locking pin 1 into place. To accomplish this, center link lift assembly 126 and left and right side link clamp assemblies 28 and 29 go off. At this time, pin 1 position assembly 60 goes off and left and right side link drop assemblies 26 and 27 go on.

Center link push assembly 134 when fully extended signals step 6 to begin. In step 6 as illustrated in FIG. 20, pin 1 push assembly 62 goes off, side link push assembly 59 extends forwardly to insure that both side links are pushed against gate assembly 32, and pin 1 turn assembly 64 goes off. Also, the first and second side link hold-down assemblies 34 and 36 go on and the left and right side link clamp assemblies 28 and 29 go on. When first and second side link hold-down assemblies 34 and 36 both push down on the side links, limit switch plates 46 and the analogous right plate are actuated, and machine 10 is signaled to go to step 7. It will be appreciated that at the completion of step 6, the second center link and both sides links are held rigidly in position and are ready for insertion of pin 2.

In step 7, as illustrated in FIG. 21 pin 2 push assembly 63 is actuated and since the side links are held otherwise rigidly in place, side link push assembly 59 goes off. Full extension of pin 2 push assembly 63 signals machine 10 to go to step 8.

In step 8, as illustrated in FIG. 22 first and second side link hold-down assemblies 34 and 36, as well as gate assembly 32, center link hold up 148 and pin 2 position assembly 61 go to the off position. Center link lift assembly 126 is actuated in step 8 which lifts the first center link about ½ of an inch, this in turn pulls the pair of side links forward and lifts the upper lips of the pair of side links above the second center link. This facilitates turning of pin 2. After center link lift assembly 126 is up, machine 10 is signaled to proceed to step 9.

In step 9, as illustrated in FIG. 23 the first side link hold-down assembly 34 is actuated which holds down the assembled first center link, first pin and pair of side links onto the center link lift 126. Pin 2 turn assembly 65 is also actuated to rotate pin 2 counter clockwise opposite the rotation of pin 1 90°. Completion of pin 2 turn signals machine 10 to proceed to step 10.

In step 10, left and right side link clamp assemblies 28 and 29 go off, as well as center link lift assembly 126. Side link push assembly 59 goes on in step 10. Machine 10 then proceeds to step 11.

Figure 24:
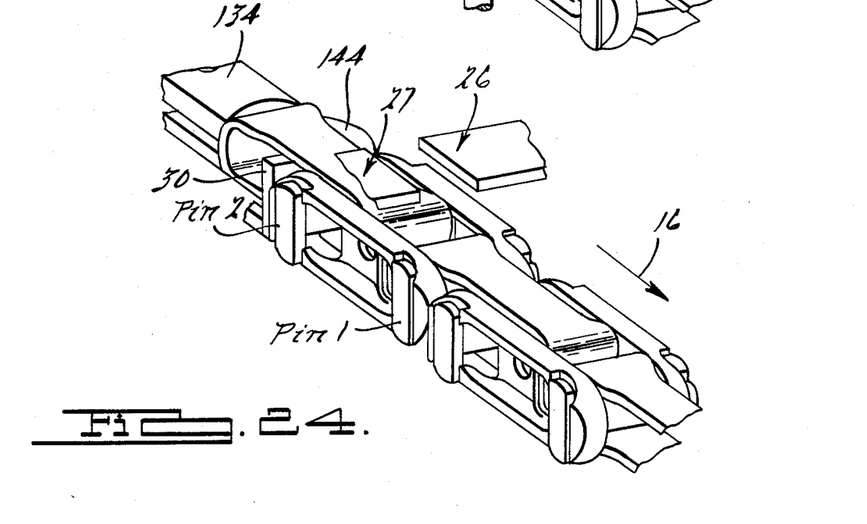
FIG. 24 is a perspective view showing the position of chain elements at step 11 of machine operation.

In step 11, as illustrated in FIG. 24 pin 2 push assembly 63, first side link hold-down 34, pin 2 turn assembly 65 and center link push assembly 134 go off. When center link push assembly 134 retracts, finger 146 of center link pull back assembly 144 pulls back on the second center link moving the second center link rearwardly thereby spreading apart the pair of side links and locking pin 2 in position. This completes the assembly of one unit of chain. Retraction of center link push assembly 134 signals machine 10 to proceed to step 12.

In step 12, machine off stop 178 goes off to allow the chain to be advanced. Upon retraction of the machine off stop, machine 10 is signaled to go to step 13.

In step 13, chain advance assembly 162 is actuated to advance the chain. As the chain is advanced, the machine is signaled to proceed to step 14.

Figure 25:
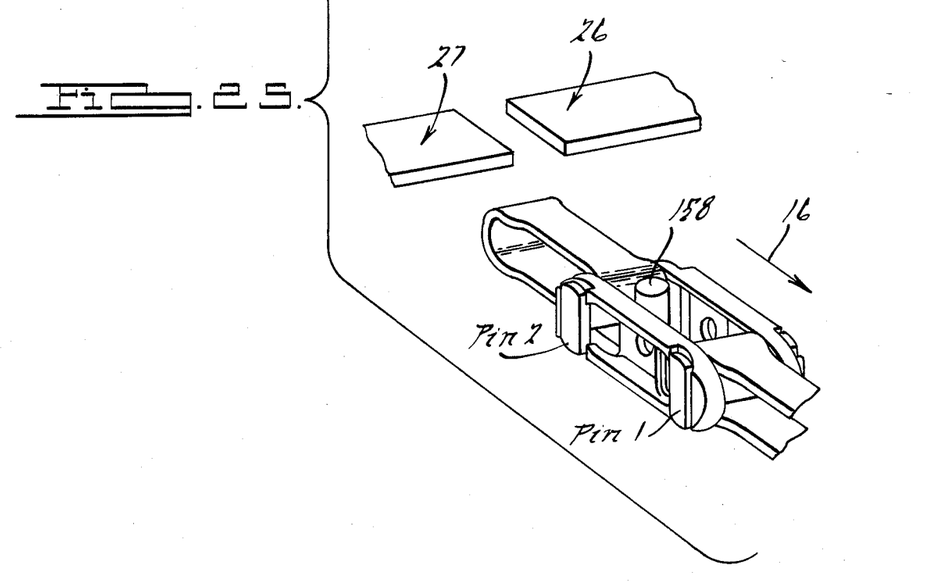
FIG. 25 is a perspective view showing the position of chain elements at step 14 of machine operation.

In step 14, as illustrated in FIG. 25 center link stop assembly 158 is actuated to provide a positive limitation of forward movement or advancement of the chain. Also, pin 1 return assembly 122 is actuated. When the chain is advanced one unit, the machine is signaled to go to step 15.

In step 15, as illustrated in FIG. 26 pin 2 return assembly 125 and left and right side link positioner assemblies 24 and 25 go on. Actuation of pin 2 return assembly 125, when complete, signals machine 10 to proceed to step 16.

In step 16, machine off stop 178 goes on, while chain advance assembly 162, side link push assembly 59, pin 2 return assembly 125 and left and right side link positioners 24 and 25 go off. This completes one cycle of machine operation and leaves the machine 10 in the ready status.

What is claimed is:

1. An apparatus for assembling conveyor chain comprising:
   (A) a base;
   (B) means supported on said base for aligning a pair of side links and a first center link;
   (C) means supported on said base for assembling a first pin in assembled relationship with said pair of side links and said first center link;
   (D) means supported on said base for aligning a second center link with said pair of side links;
   (E) means supported on said base for assembling a second pin in assembled relationship with said pair of side links and said second center link; and
   (F) means supported on said base for advancing assembled side links and center links;

said means for aligning a pair of side links and a first center link having for each of said pair of side links, a feed rack for holding a plurality of side links and means for guiding a side link from said feed rack to an aligned position, and for said center link, a feed rack for holding a plurality of center links and means for guiding each center link from said feed rack to an aligned position; said means for assembling said first pin and said means for assembling said second pin each having a feed rack, means for inserting each said pin through said side links and respective center link and means for rotating each said pin into assembled position.

2. An apparatus as in claim 1 wherein each said means for guiding a side link includes a pusher and a guide rail.

3. An apparatus as in claim 2 wherein said means for guiding a center link comprises a pusher and a pair of guide rails.

4. An apparatus as in claim 3 wherein said means for inserting each said pin comprises an axially and rotatably movable rod having a shoe at the forward end thereof.

* * * * *